May 23, 1961 L. WESCH 2,985,844

OSCILLATOR HAVING STABILIZED DETUNED DEGENERATIVE FEEDBACK CIRCUIT MEANS

Filed Dec. 4, 1957 7 Sheets-Sheet 1

INVENTOR:
LUDWIG WESCH

BY [signature]
AGENT

May 23, 1961

L. WESCH 2,985,844

OSCILLATOR HAVING STABILIZED DETUNED DEGENERATIVE FEEDBACK CIRCUIT MEANS

Filed Dec. 4, 1957

7 Sheets-Sheet 2

LUDWIG WESCH
INVENTOR

BY

AGENT

LUDWIG WESCH
INVENTOR

BY [signature]
AGENT

LUDWIG WESCH
INVENTOR

BY [signature]
AGENT

LUDWIG WESCH
INVENTOR

BY [signature]
AGENT

LUDWIG WESCH
INVENTOR
BY [signature]
AGENT

LUDWIG WESCH
INVENTOR
BY [signature]
AGENT

United States Patent Office 2,985,844

Patented May 23, 1961

2,985,844

OSCILLATOR HAVING STABILIZED DETUNED DEGENERATIVE FEEDBACK CIRCUIT MEANS

Ludwig Wesch, Schlosswolfsbrunnenweg 10, Heidelberg, Germany, assignor to Eltro G.m.b.H. & Co. Gesellschaft für Strahlungstechnik, Heidelberg, Germany Filed Dec. 4, 1957, Ser. No. 700,670

Claims priority, application Germany Dec. 11, 1956

10 Claims. (Cl. 331—66)

My present invention relates to an oscillator adapted to operate in a transient oscillatory condition, as disclosed in my co-pending application Ser. No. 636,914, filed January 29, 1957, now Patent No. 2,896,089.

By relatively detuning the input and the output circuit of a conventional oscillator, e.g. the grid-cathode and the plate-cathode circuit of an ultra-high-frequency vacuum-tube oscillator with internal regenerative feedback, it is possible so to adjust the oscillator that the same operates on a sloping portion of its amplitude frequency characteristic, its operating point along the characteristic being determined by the circuit and tube constants. Through the use of negative inductive feedback between the aforementioned circuits it is further possible to steepen the slope of the characteristic so that small changes in either circuit (or in some other component of the system) will give rise to substantial amplitude variations.

Generally, however, an oscillator of this character is too unstable in its operation to be capable of serving as a satisfactory amplitude modulator, especially when a high-gain tube is used and/or when the operating wave length is in the decimeter or the centimeter range. The invention has for its object the provision of an oscillator of the character described in which this instability is substantally eliminated.

In accordance with the invention I provide, in an oscillator of the type set forth, an additional degenerative feedback circuit so connected to one of the electrodes of its amplifier element as to provide a maximum negative voltage or current feedback at a frequency near the desired operating point, thus at a sloping part of the oscillator characteristic along which modulation is to take place.

In the case of a vacuum-tube oscillator this additional feedback circuit may, for example, take the form of a parallel-resonant circuit connected to the cathode lead of the tube, e.g. as shown in Fig. 6 of my aforementioned copending application. That application also discloses various other features of my invention described hereinafter.

In the accompanying drawing:

Fig. 1 is a circuit diagram of an oscillator embodying the invention;

Figs. *1a* to *1c* are diagrams similar to that of Fig. 1 showing other embodiments of the invention;

Figure 1:
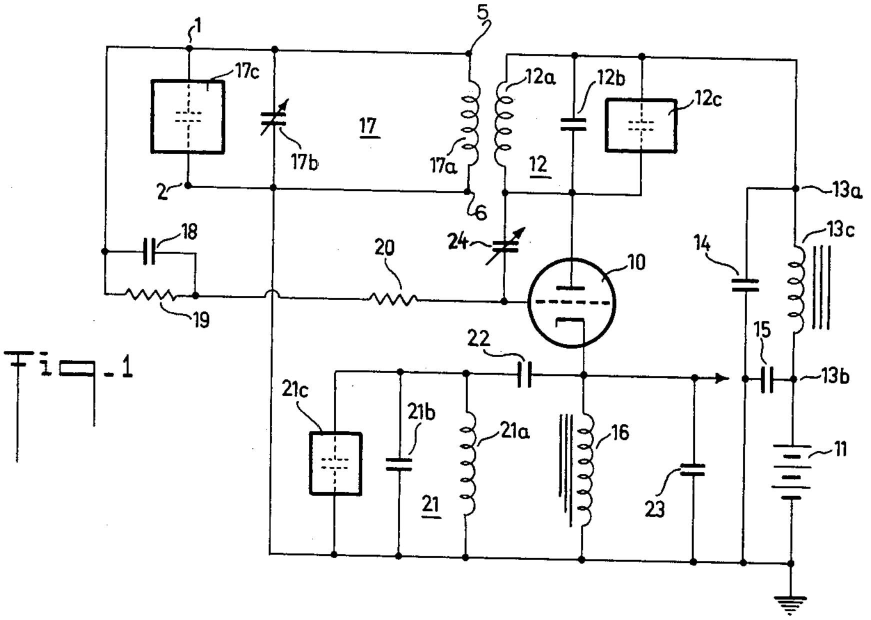
Figure 1A:
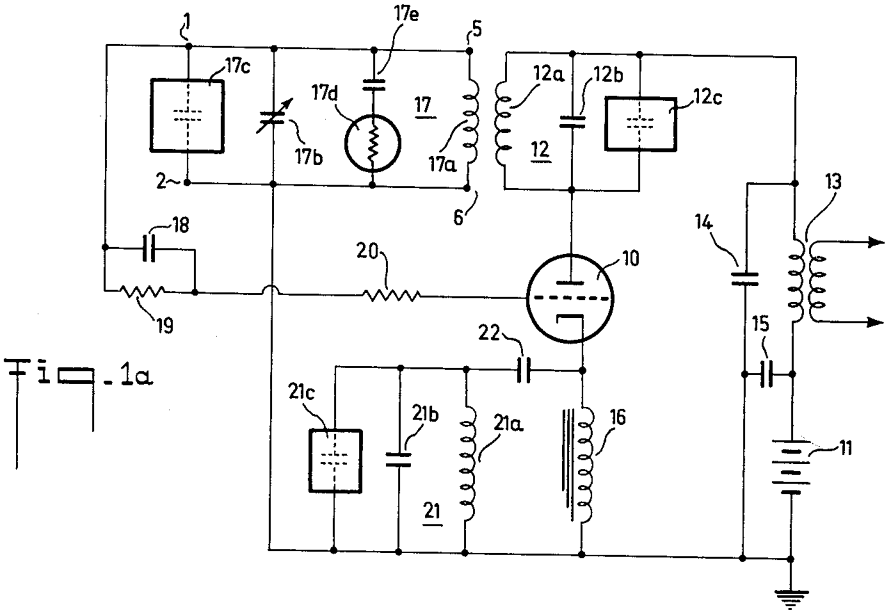

Figs. 1, *1a*, *1b* and *1c* show an oscillatory system comprising a vacuum tube 10, here shown for the sake of simplicity as a triode, whose plate is energized from a source of direct current, illustrated schematically as a battery 11 with grounded negative terminal, through an oscillatory circuit 12 including an inductance **12*a* and a capacitance 12*b*. The primary winding of an output transformer 13 or a relay 13*c* may be connected to any suitable electrode of the amplifier, as for example between terminals 13*a* and 13*b* in series with circuit 12, and has both of its terminals shunted to ground for high-frequency currents via respective condensers 14 and 15. The modulating members may be connected with the terminals 1, 2 or 5, 6**.

The cathode of tube 10 is connected through a choke coil 16 to ground and to one terminal of a tuned input circuit 17 whose other terminal is connected to the grid of the tube by way of a coupling condenser 18, shunted by a large resistor 19, and a series resistor 20 large enough to prevent the condenser 18 and the capacitive branch of tuned circuit 17 from acting as a shunt to ground for the high-frequency oscillations induced on the grid through the grid-plate capacitance. The said capacitive branch comprises a condenser **17*b* shunted by a variable control capacitance forming part of a modulating element 17*c*. The inductive branch of circuit 17 is represented by a coil 17*a* inductively coupled with coil 12*a*** so as to provide negative feedback between the plate and the grid of the tube. As shown in Figs. *1a*, *1b*, and *1c*, a non-linear resistor, such as a negative thermistor **17*d*, may be included in a further shunt arm of circuit 17, in series with a blocking condenser 17*e*, as a means to help stabilize the operating point of the system; thus, rising voltages across the thermistor have the effect of reducing its resistance and thereby increasing the damping of circuit 17**, this in turn causing a decrease in oscillation amplitude, and vice versa.

Connected to the cathode of tube 10, in parallel with choke coil 16, is a parallel-resonant circuit 21 including an inductive branch **21*a* and a capacitive branch 21*b*. A coupling condenser 22 isolates the circuit 21** from the direct-current path through the tube.

Figure 2:
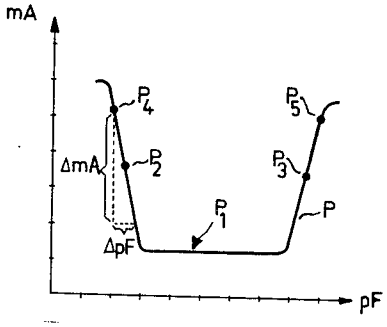
Fig. 2 is a graph illustrating the amplitude variations of the oscillator output as a function of changes in the capacitance of a controlling circuit element and, therefore, in the operating frequency of the system.

Reference is now made to Fig. 2 in which the amplitude of the oscillating plate current, in milliamperes, is plotted against the capacitance, in picofarads or micro-microfarads, of a variable control device such as the element **17*c*. If the circuits 12 and 17 are substantially in tune, the system operates in a stable condition on the horizontal branch $P_1$ of the curve P. With progressive detuning in either direction, a sloping portion is encountered in the vicinity of point $P_2$ or $P_3$ until, beyond point $P_4$ or $P_5$, the oscillations cease altogether. For a maximum amplitude swing it is desirable to choose an operating point remote from the horizontal branch $P_1$, such as point $P_2$ or $P_3$, and to use a tube of high gain for the triode 10**. Thus, the slope S of the characteristic at the operating point, defined as $S=\Delta mA/\Delta pF$, may be as high as 1,000 in a system according to the invention, a preferred value being $S=500$ although in special cases values up to 10,000 may be realized.

With an operating point established on the left-hand slope of curve P, e.g. at $P_2$, i.e. with the input oscillatory circuit 17 tuned to a frequency lower than the resonance frequency of the output oscillatory circuit 12, the system will tend to drift toward such lower frequency. To counteract this tendency, the circuit 21 should be adjusted to have a resonance frequency somewhat below that of circuit 12, beyond operating point $P_2$ along the sloping left-hand portion of curve P, i.e. the reactance of its inductive branch should be exceed that of its capacitive branch at the operating frequency. Since, however, the drifting of the oscillator gives rise to a rich spectrum of harmonics, it is also possible to tune the circuit to a harmonic or a subharmonic of such off-frequency.

It has been found that the arrangement described not only increases the sensitivity of the system but also improves its linearity. With proper selection of the constants of circuit 18, 19, the oscillations will be integrated and the low-frequency modulating signal will be available at the output 13.

Figure 1B:
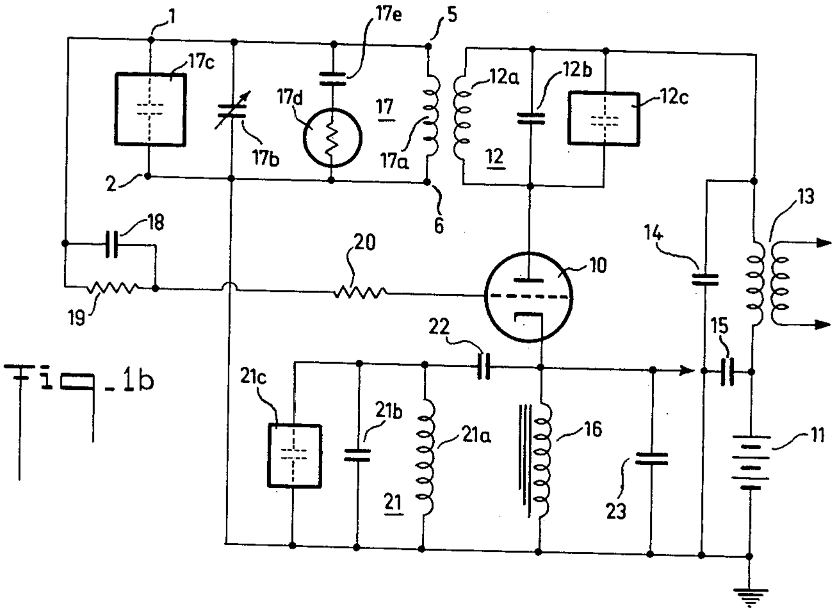

The control element **17*c* may be, for example, a photocondenser responsive to visible light, ultraviolet rays or any other high-intensity radiation impinging upon its insulator to vary the dielectric constant thereof. A system so equipped may be used in motion-picture apparatus or other photorecording devices, light-operated gates, photoelectric counters and the like. Again, temperature changes may be used to control a condenser with a thermosensitive dielectric, such as barium titanate, having a high thermal coefficient of capacitance. Similarly, a dielectric bolometer may be employed. A further example of a variable control capacitance is a condenser microphone. Particularly in the latter instance, but also in other cases, it may be desirable to connect the tube 10 as a cathode follower by developing the output across a suitable impedance, such as the choke 16, connected in its cathode lead, this impedance being preferably bridged by a high-frequency shunt such as the condenser 23** indicated in Figs. 1 and 1*b*; the tube 10 will then advantageously be a power tube, such as a high-gain pentode. By this means it will be possible to apply the amplified low-voltage output directly, i.e. without the interposition of distortion-causing circuit elements such as transformers and/or further amplifier stages, to a desired load, e.g. a loudspeaker. With power supplied to the high-voltage electrodes (plate, screen grid) of the tube via low-ohmic direct-current connections, the system when thus operated as a cathode follower will work as a signal source of low internal resistance. Besides the cathode-follower output there may also be used an output impedance of suitable magnitude connected in the plate lead of the tube, e.g. as shown for the transformer 13.

The cathode impedance 16 bridged by high-frequency shunt 23 is also representative of a negative-feedback circuit for low-frequency currents or voltages designed to minimize non-linear distortions of the modulating signal. Such feedback may also be realized by inserting a large resistor in the suppressor-grid lead of a pentode as shown and as will be described later in connection with Fig. 16.

Since the control element **17*c* may be subject to aging or may change its impedance to an objectionable extent in response to ambient conditions unrelated to the modulating signal, I prefer to compensate this effect by the inclusion of similar, non-variable elements in either or both of the other two tuned circuits, i.e. resonant plate circuit 12 and resonant cathode circuit 21, as indicated at 12*c* and 21*c***.

Figure 6:
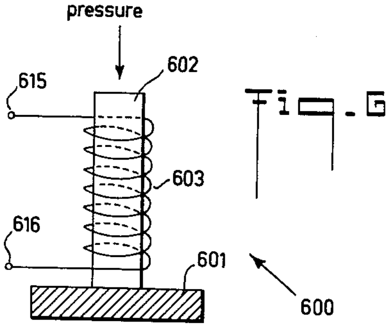

In Fig. 6 of my aforementioned patent I have shown the grid and the plate of the amplifier tube connected not to the high-voltage terminal of the tuned input circuit and the tuned output circuit, respectively, but to taps on the inductances of these circuits corresponding to the coils **17*a* and 12*a*. This has the advantage of reducing the effect of minor variations in interelectrode capacitances (e.g. during filament warmup or upon a replacement of the tube) on the operating frequency of the system. The connection may be made to the midpoints of the coils, as in Fig. 18, or preferably to a tap located approximately one-third of the coil length from the high-voltage terminal. The same mode of connection may, of course, also be employed at the cathode resonant circuit 21**.

Figures 16, 17:
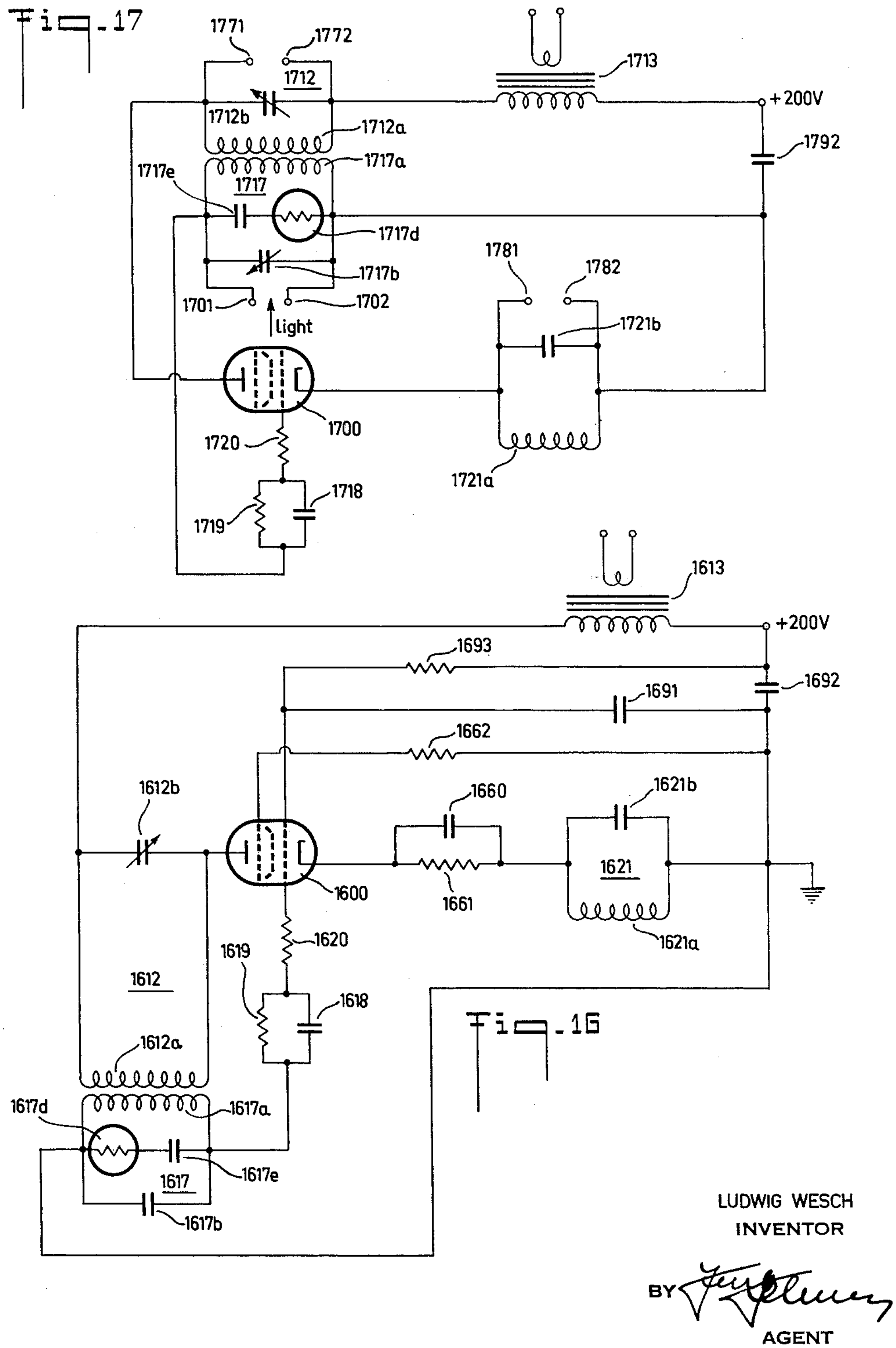

The illustrated connection of circuit 21 to the cathode of tube 10 in shunt with the direct-current lead through choke 16, and with interposition of a blocking condenser 22, is especially recommended when the tube draws a large current and/or when maximum sensitivity is desired. It is, however, also possible to connect this circuit in series with choke 16 (or with an equivalent cathode resistance), again as illustrated in Fig. 16.

The elements **12*c*, 17*c* and 21*c* are interchangeable in the sense that the variable control element may be included, with somewhat lower sensitivity of the system, in either of the other tuned circuits 12, 21** of the oscillator.

In principle, modulation may also be brought about by the variation of circuit parameters other than the capacitance of a tuned circuit. Similarly, such other parameters may be utilized in lieu of an adjustment of trimmer condenser **17*b* (or its counterparts 12*b*, 21*b*) to establish the operating point of the oscillator on a desired portion of curve P. Among such parameters may be mentioned the various inductances and other circuit impedances, the tube gain, and the degree of negative feedback at coils 12*a*, 17*a* or at circuit 21**.

Thus, for example, the inductivity of coil **17*a*** may be controlled by mechanically displacing a ferromagnetic core, by varying the permeability of the core material with the aid of large alternating or direct currents passing through separate windings on the core, or by changing the ferromagnetic properties of this material in any other known manner. Again, these changes may be effected by the operation of a microphone.

The serial or parallel inclusion of dielectric, magnetic, photoresistive or other loss material of adjustable resistivity may also be used to control the tuning of the resonant circuits, although the efficiency of such a system will be less than that of an oscillator responsive to reactance variations.

Moreover, any of the resistive or reactive circuit impedances may be replaced by an equivalent tube or other amplifier element adapted to respond to a control signal.

Figure 1C:
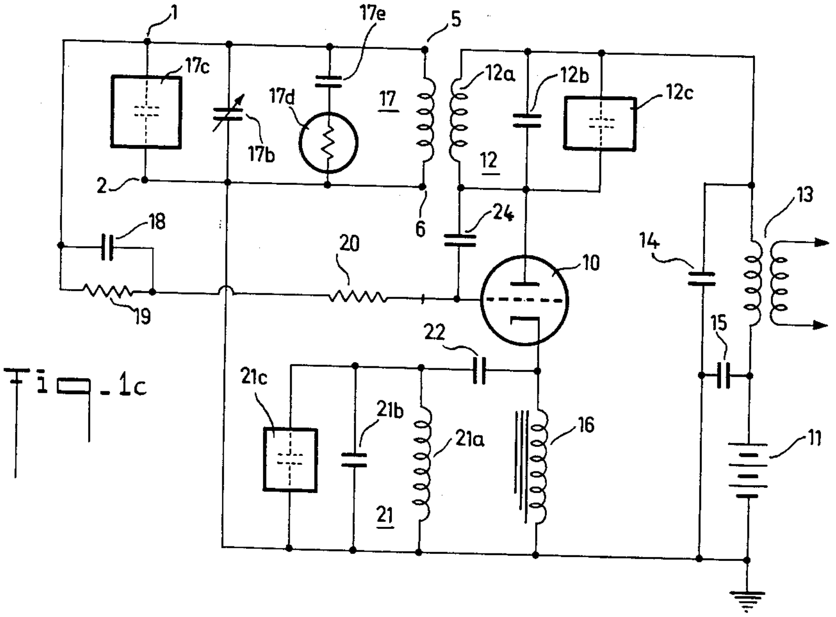

In similar manner, the gain of the oscillator tube 10 itself may be varied through the application of a suitable control potential to any of its electrodes, and/or through the shunting of its grid-plate capacitance by an adjustable condenser as illustrated in Figs. 1 and 1*c* at 24. The shunt capacitance may again be an amplifier element.

Moreover, with the aid of some of the measures previously mentioned it is possible to vary the degree of coupling between circuits 12 and 17 (as by partially saturating a ferromagnetic core common to coils **12*a*, 17*a*) or between circuit 21 and the cathode of tube 10 (as by modifying the capacitance of condenser 22**).

Besides multigrid tubes, such as pentodes, I may also use dual tubes such as double triodes or a triode-hexode combination in lieu of the simple triode 10. An example of such a dual tube is shown in Fig. 6 of my above-identified patent, one tube section being of the luminous "magic eye" type so as to be capable of indicating, as a function of amplitude, the operating point of the oscillation generator or the control signal applied to it. As likewise illustrated in that figure, a relay or the like and/or a glow tube may be inserted directly in an electrode lead of the amplifier to carry out the desired operation or to indicate visually the state of the system.

It will be understood that amplifier elements other than tubes, e.g. solid-state transducers such as transistors, may be used in systems according to the invention with only such modifications of the circuits as are readily apparent to persons skilled in the art. Output impedances such as transformer 13 or choke 16, connected in the plate (or screen-grid) lead or the cathode lead of a vacuum tube as shown in the drawing, will then have to be replaced by similar impedances inserted in the lead of a suitable output electrode of the transistor, such as its base electrode.

Figures 3, 4:
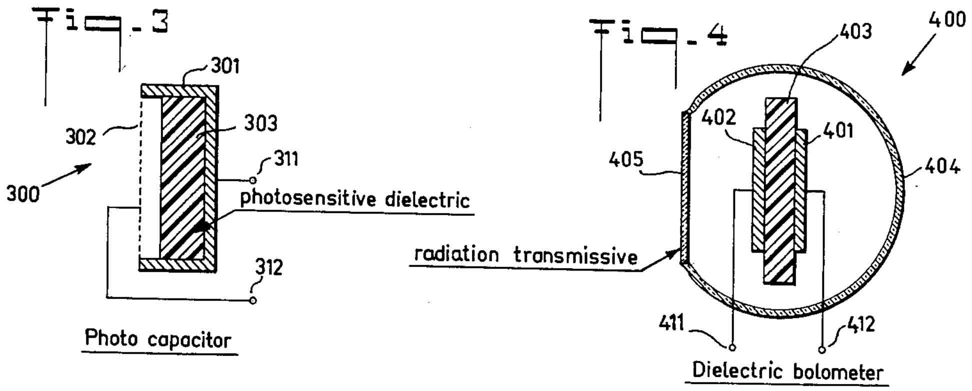
Figs. 3 to 14 illustrate various modulating elements which may be used in the circuits of the invention.

Fig. 3 shows in greater detail a photocapacitor 300 adapted to be used as the control element **17*c* and/or the control elements 12*c*, 21*c*. This capacitor comprises a metallic base 301, a light-transmitting electrode 302, for example a grid or a coating deposited by evaporation, and a light-sensitive dielectric material 303 disposed within the metallic base 301, i.e. a material which changes its dielectric constant as a function of the intensity of the light transmitted past the electrode 302. The photocapacitor has terminals 311, 312 which may be connected to the terminals 1 and 2** in Fig. 1.

Fig. 4 shows a dielectric bolometer 400 comprising a metallic base 401, a coating 402 of silver or gold deposited by evaporation and darkened by evaporated bismuth, a layer 403 of dielectric material of a thickness of 1/100 mm. to 1 mm., preferably 1/10 mm., a glass envelope 404 and a radiation-transmitting window 405 consisting for example of KB*r* or NaCl in the glass ball 404. The bolometer 400 has terminals 411, 412 which may be connected, in lieu of those of capacitor 300, to the terminals 1 and 2 in Fig. 1.

Figure 5:
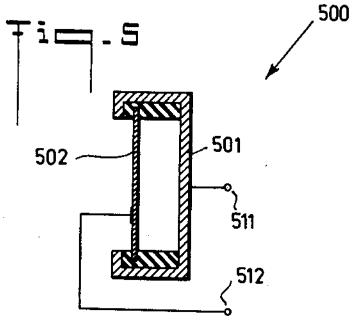

Fig. 5 shows a condenser microphone 500 comprising a metallic base 501 and a sound-sensitive membrane 502. The microphone 500 has terminals 511, 512 which may be connected, instead of those of capacitor 300, to the terminals 1 and 2 in Fig. 1.

Figure 8:
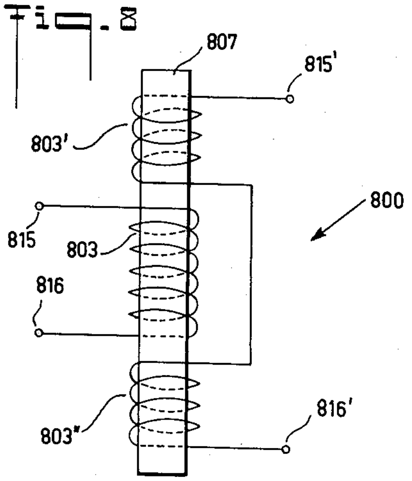
Figure 7:
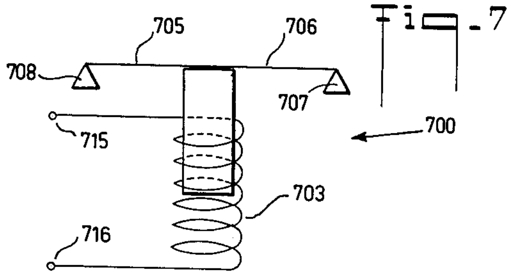

The transformer winding connected across the terminals 5 and 6 in Fig. 1 may be replaced by the pressure-responsive inductive element 600 shown in Fig. 6. This element comprises a compact metal base plate 601, a core 602 of a pressure-responsive ferromagnetic material and a coil 603 with the terminals 615 and 616. The winding may also be replaced by the system 700 shown in Fig. 7, comprising a ferromagnetic core 705, a sound-responsive membrane 706, a coil 703 with the terminals 715 and 716, and a pair of supports 707, 708 for the membrane 706; or by the system 800 shown in Fig. 8, comprising a ferromagnetic core 807, a coil 803', 803'' with the terminals 815' and 816' for connecting the coil with a D.C. or A.C. source and a coil 803 with the terminals 815 and 816.

Figure 9:
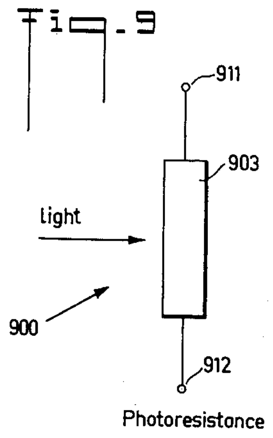

A photoresistance 900 as shown in Fig. 9, having a resistance value greater than 5000 ohms and comprising a photoresistive layer 903 as well as terminals 911 and 912, may likewise be connected across the terminals 1 and 2 in Fig. 1.

Figure 10A:
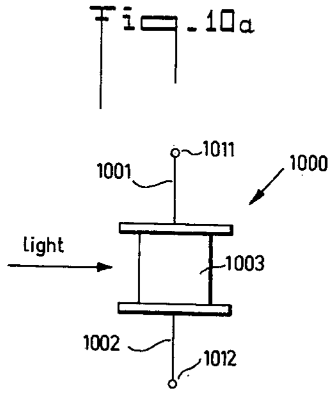

Fig. 10*a* shows a photocell 1000 comprising a semiconductive or rectifying body 1003.

Figure 10B:
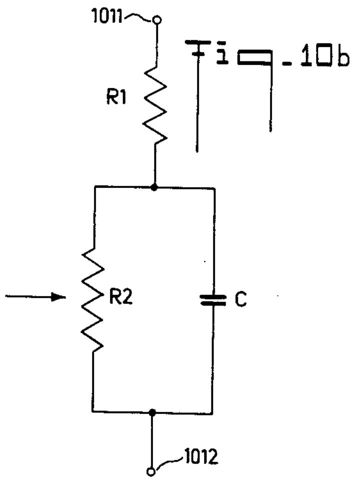

Fig. 10*b* shows the equivalent-circuit diagram of cell 1000 comprising the ohmic resistance $R_1$ of the terminal leads 1001, 1002, the nondissipative capacity C of the element 1003 and its equivalent resistance $R_2$, the value of which changes substantially by the release of free electrons under the action of electromagnetic or corpuscular radiation. The photocell has terminals 1011, 1012 which again may be connected with the terminals 1 and 2 in Fig. 1.

A reactance-tube device as shown in Figs. 11–14 may also be connected across the terminals 1 and 2 in Fig. 1. This device comprises a tube V which may be connected in various ways.

Figure 11:
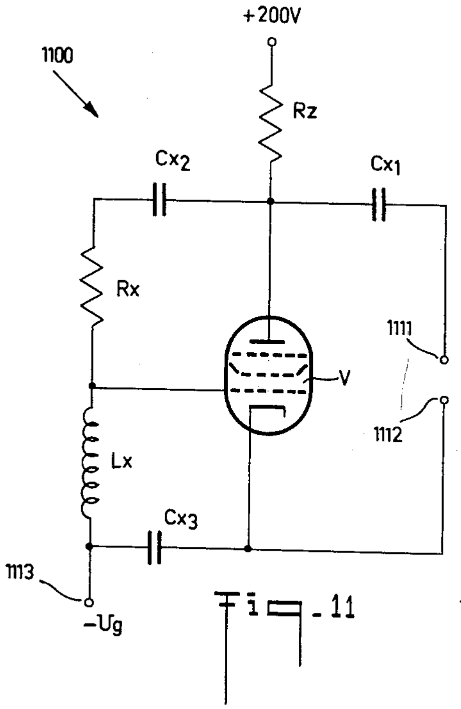

Fig. 11 shows a circuit 1100 having an apparent capacitance $C_s$ which may be altered by control of the slope of the emission characteristic (gain) of the tube V. In this figure:

1111, 1112 are the terminals for the oscillating circuit.

$C_{x1}$ is a condenser preferably of 100 pF.

$C_{x2}$ is a condenser preferably of 200 pF.

$C_{x3}$ is a condenser preferably of 1000 pF.

$R_z$ is an anode-impedance which may be a resistance, as shown, or an inductance coil.

$R_x$ is a resistance determining the rate of feedback.

$L_x$ is an inductance determining the rate of feedback.

The combination of $R_x$ and $L_x$ determines the apparent capacitance $C_s$ whose value in farads is related to the tube gain $S_{max}$ according to the formula:

$$C_s = \frac{L_x \cdot S_{max}}{R_x} [F]$$

The modulation is performed by changing the gain, i.e. by varying the grid bias U*g* on point 1113.

Figure 12:
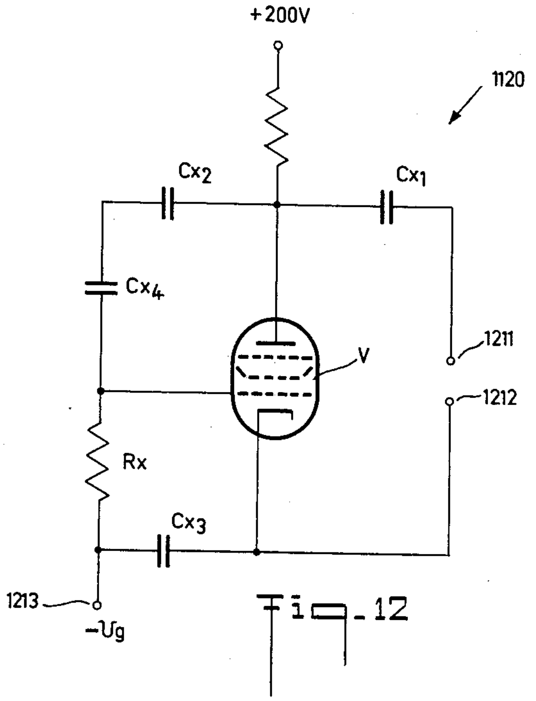

Fig. 12 shows a circuit 1200 also having a controllable apparent capacitance. The reference symbols are the same as in Fig. 11; the terminals connectable to points 1, 2 in Fig. 1 have been designated 1211, 1212.

$C_{x4}$ is a condenser preferably of 50 pF determining the rate of feedback. $C_{x4}$, $R_x$ and the gain are related to the controllable apparent capacitance according to the formula:

$$C_s \approx C_{x4} \cdot R_x \cdot S_{max} [F]$$

The modulation is performed by changing the gain by means of the grid bias U*g* on point 1213.

Figure 13:
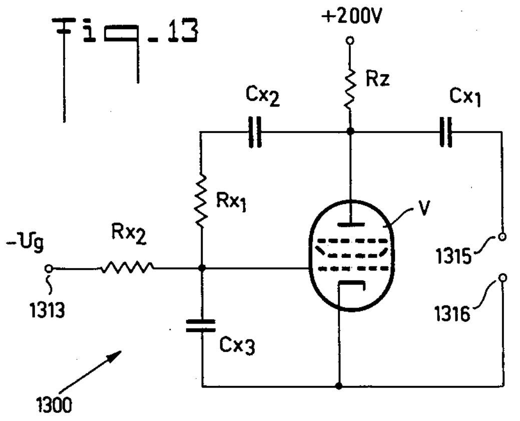

Fig. 13 shows a circuit 1300 having a controllable apparent inductance adapted to be connected, by its terminals 1315, 1316 across the points 5, 6, in lieu of the inductance **17*a***.

$C_{x1}$ is a blocking condenser preferably of 200 pF.

$C_{x2}$ is also a blocking condenser preferably of 200 pF.

$C_{x3}$ is a feedback determining capacitance preferably of 200 pF.

$R_{x1}$ is a feedback determining resistance.

$R_{x2}$ is a blocking resistance.

$R_z$ is an anode resistance, which may be replaced by a choke.

$C_{x3}$, $R_{x1}$ and the gain determine the value, in henries, of the controllable apparent inductance $L_s$ according to the formula:

$$L_s \approx \frac{C_{x3} R_{x1}}{S_{max}} [H]$$

The modulation is performed by changing the gain by means of the grid bias U*g* on point 1313.

Figure 14:
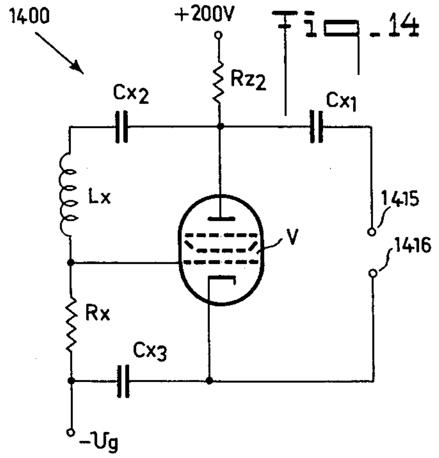

Fig. 14 shows another circuit 1400 having a controllable apparent inductance.

$C_{x1}$ is a blocking condenser of 200 pF.

$C_{x2}$ is another blocking condenser of 200 pF.

$C_{x3}$ is a blocking condenser of 1000 pF.

$R_z$ is an anode resistance which may be replaced by a choke.

$L_x$ is a feedback determining inductance.

$R_x$ is a feedback determining resistance.

$L_s$, $L_x$, $R_x$ and the tube gain are interrelated according to the formula:

$$L_s \approx \frac{L_x}{R_x S_{max}} [H]$$

The modulation is performed by changing the gain, i.e. by changing the grid bias U*g* on point 1413; the terminals connectable to points 5 and 6 have been designated 1415 and 1416.

Figure 15:
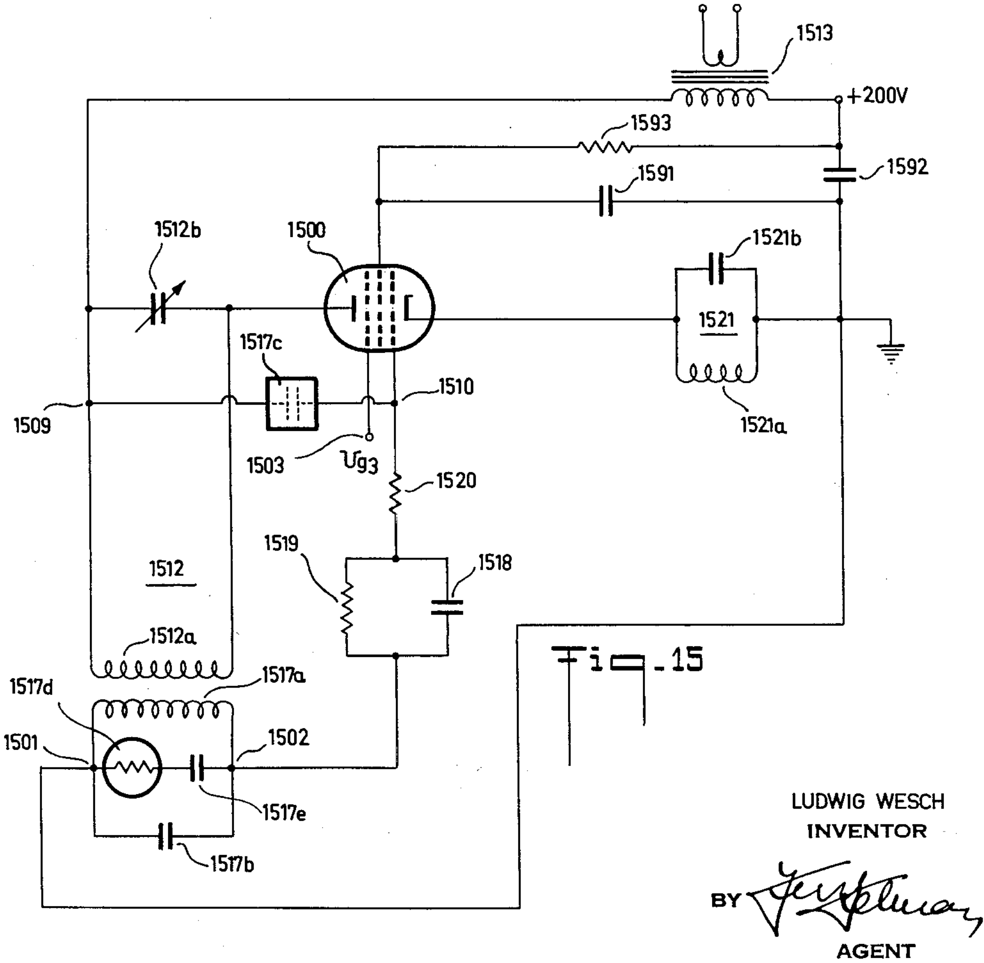
Figs. 15–19 are circuit diagrams of still other embodiments of the invention.

Fig. 15 shows a wiring diagram of a circuit generally similar to that of Fig. 1 but comprising a multi-grid tube 1500. The characteristic curve (gain) of the oscillating tube 1500 may be controlled by the bias $U_{g3}$ at point 1503 in the suppressor-grid lead.

A condenser **1517*c* may be connected across the points 1509 and 1510 to control the grid-anode capacity of the oscillating tube. The condenser operates therefore as a modulating or control member. The remaining elements in this figure correspond to those similarly labeled (without the first two digits) in Fig. 1. Biasing potential is supplied to the screen grid of tube 1500 from the positive battery terminal +200 v. via a network comprising condensers 1591, 1592 and resistor 1593**.

The elements shown connected across the terminals 1501 and 1502, such as the resistor **1517*d* and condenser 1517*e* as described, may alternatively be shunted across the points 1509 and 1510**. The value of the shunt capacitance should be generally not greater than twice the value of the grid-anode capacitance.

Fig. 16 shows a wiring diagram again similar to that of Fig. 1 but utilizing negative feedback in the cathode circuit.

In Fig. 16 element 1661 a negative feedback resistance which causes a degenerative current feedback at low frequencies.

Element 1660 is a shunt capacitance for high-frequency currents (preferably of 200 pF).

Element 1662 is a resistance in the suppressor-grid lead of tube 1600 which also reduces negative feedback. Its value is preferably 500,000 ohms. The remaining reference characteristics are identical with those of Fig. 15, except for the substitution of "16" for "15" in the first two digits.

Fig. 17 shows a circuit diagram similar to those of Figs. 15 and 16, using analogous reference numerals, wherein the oscillating circuits 1712, 1717 and 1721 are shown with open-circuited terminals 1701—1702, 1771—1772 and 1781—1782, respectively. A light-responsive modulating member such as photocondenser 17*c* of Fig. 1 or equivalent capacitance responsive to the effect of temperature may be connected across these terminal points.

If the modulating member is bridged across points 1701 and 1702, equivalent but unmodulated elements (e.g. condensers) may be bridged across the points 1771, 1772, and 1781, 1782, as described in connection with Fig. 1. Since all elements have the same temperature response, the fundamental frequency of the oscillation generator does not vary. The circuit arrangement is therefore thermally stable.

Figure 18:
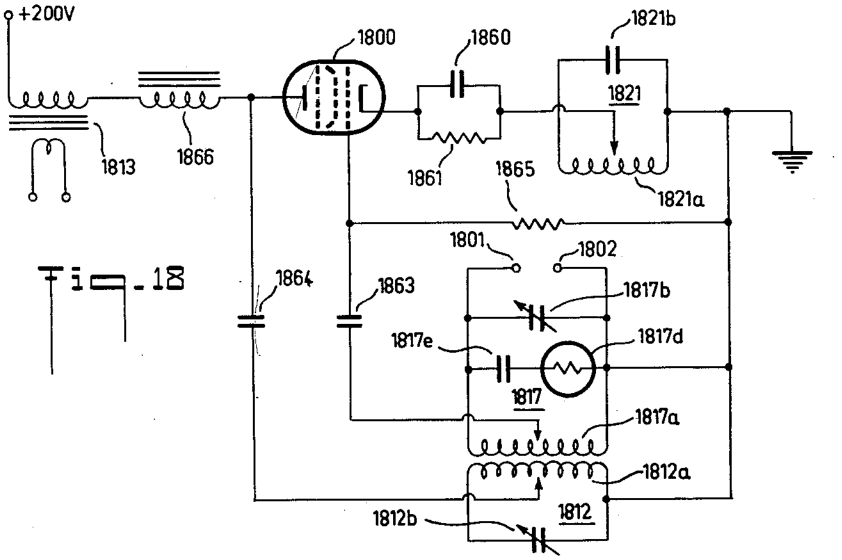
Figure 19:
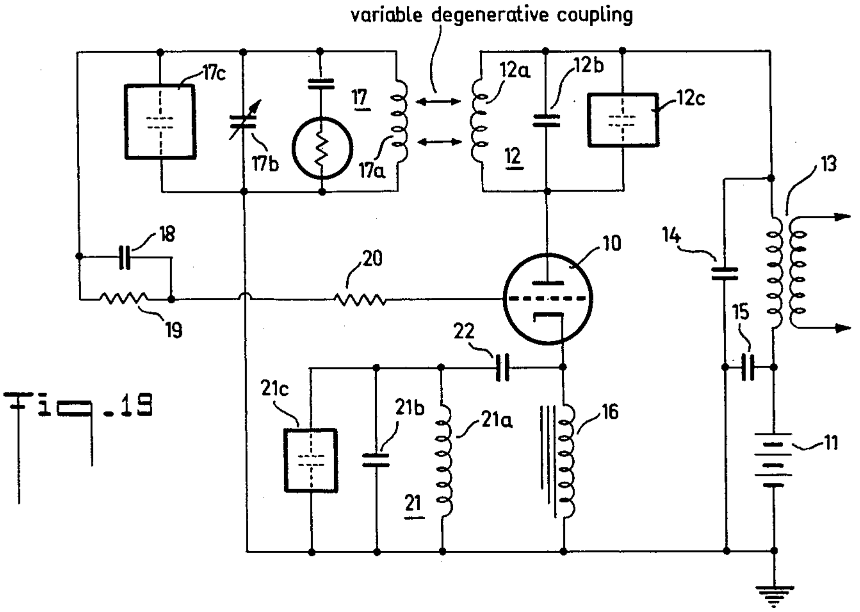

Fig. 18 shows a circuit diagram which was found as one of the most stable. The various oscillating circuits 1812, 1817, 1821 are connected to the associated electrodes of amplifier tube 1800 not directly but via taps on their respective inductances 1812*a*, 1817*a*, 1821*a*. The fluctuations and the noise in the oscillating circuits are therefore of reduced effect. The circuits are substantially free of direct current, this resulting in an improvement of the stability of the system. The control grid of tube 1800 is connected to the tap on inductance 1817*a* through a blocking condenser 1863, a similar condenser 1864 being connected between the plate of the tube and the tap on inductance 1812*a*. A grid-leak resistor 1865 is inserted between the control grid and ground while a choke coil 1866 lies between the plate of the tube and output transformer 1813. The tap on inductance 1821*a* is connected to the cathode of tube 1800 through the negative-feedback network 1860, 1861. The remaining elements are similar to those of the preceding figures and have been analogously designated. The transformer 1813 may be replaced by a resistance. In this case the low-frequency voltage may be taken off from a capacitance bridged across this resistance.

It will thus be seen that I have provided a novel oscillation generator which is extremely versatile in use, stable in operation, high in sensitivity, and simple in construction. Naturally, modifications other than those specifically mentioned above are possible without departing from the spirit and scope of the invention as defined in the appended claims.

I claim:

1. An oscillation generator comprising oscillatory amplifier means having a plurality of electrodes including an input electrode and an output electrode, a first resonant circuit connected to said input electrode, a second resonant circuit connected to said output electrode and degeneratively coupled to said first resonant circuit, said resonant circuits being relatively detuned to a sufficient extent to maintain the operating point of said amplifier means on a sloping portion of the amplitude/frequency characteristic thereof, a negative-feedback path for said amplifier means including a third resonant circuit connected to one of said electrodes, said third resonant circuit being tuned to a frequency at least harmonically related to a frequency lying beyond said operating point along said sloping portion whereby drifting of said operating point along said sloping portion is prevented, and frequency-determining means in at least one of said resonant circuits for varying the location of said operating point on said sloping portion, said frequency-determining means comprising a signal-responsive first reactive element in one of said resonant circuits, and a second reactive element substantially identical with said first reactive element, but arranged to respond only to ambient conditions, inserted in each of said resonant circuits other than said one of said resonant circuits.

2. An oscillation generator according to claim 1 wherein said third circuit is parallel resonant, said negative-feedback path including an impedance shunted by said parallel-resonant circuit.

3. An oscillation generator according to claim 1 wherein each of said reactive elements is a photocondenser.

4. An oscillation generator according to claim 1 wherein said first and second resonant circuits are inductively coupled to each other.

5. An oscillation generator comprising a voltage source, a vacuum tube provided with a cathode, a plate and at least one grid, a first resonant circuit connected between said grid and the negative terminal of said source and tuned to a first frequency at which feedback between said plate and said grid is effective to maintain said tube in an oscillatory state, a second resonant circuit connected between said plate and the positive terminal of said source and inductively coupled to said first resonant circuit in a degenerative sense, said second circuit being tuned to a second frequncy close to said first frequency but sufficiently different therefrom to maintain the operating point of said tube on a sloping portion of its amplitude/frequency characteristic, a negative-feedback path connected between said negative terminal and said cathode, a third resonant circuit in said path so tuned as to produce maximum degenerative action at a frequency lying beyond said operating point along said sloping portion whereby drifting of said operating point along said sloping portion is prevented, and frequency-determining means in at least one of said resonant circuits for varying the location of said operating point on said sloping portion.

6. An oscillation generator according to claim 5, further comprising adjustable capacitive means connected across said plate and said grid.

7. An oscillation generator according to claim 5 wherein said feedback path comprises a cathode impedance, said third resonant circuit including a capacitive and an inductive branch tuned to parallel resonance and connected across said impedance.

8. An oscillation generator according to claim 7 wherein said impedance is an inductance.

9. An oscillation generator comprising a vacuum tube provided with a cathode, a plate and at least one grid, a first resonant circuit connected to said grid and tuned to a first frequency at which feedback between said plate and said grid is effective to maintain said tube in an oscillatory state, a second resonant circuit connected to said plate and inductively coupled to said first resonant circuit in a degenerative sense, said second circuit being tuned to a second frequency close to said first frequency but sufficiently different therefrom to maintain the operating point of said tube on a sloping portion of its amplitude/frequency characteristic, a negative-feedback path connected to said cathode, a third resonant circuit in said path so tuned as to produce maximum degenerative action at a frequency lying beyond said operating point along said sloping portion whereby drifting of said operating point along said sloping portion is prevented, and frequency-determining means is at least one of said resonant circuits for varying the location of said operating point on said sloping portion, said feedback path comprising a cathode impedance, said third resonant circuit including a capacitive and an inductive branch tuned to parallel resonance and connected across said impedance.

10. An oscillation generator according to claim 9 wherein said impedance is an inductance.

References Cited in the file of this patent

UNITED STATES PATENTS

| | | |
|---|---|---|
| 1,899,026 | Fessenden | Feb. 28, 1933 |
| 2,115,858 | Keall | May 3, 1938 |
| 2,382,198 | Bollinger | Aug. 14, 1945 |
| 2,436,129 | Weathers | Feb. 17, 1948 |
| 2,495,177 | Norde | Jan. 17, 1950 |
| 2,662,408 | Ellison | Dec. 15, 1953 |